Patented Sept. 14, 1943

2,329,680

UNITED STATES PATENT OFFICE 2,329,680

DEFOLIATION

Thomas L. Wilkerson, Toccoa, Ga., assignor to American Cyanamid Company, New York, N. Y., a corporation of Maine No Drawing. Application January 30, 1943, Serial No. 474,227

4 Claims. (Cl. 47—58)

The present invention relates to the defoliation of growing plants.

The principal object of the present invention is not only to defoliate plants where such action is desirable but to indirectly thereby increase the value of crops from such plants, either through hastening maturity, increase in grade of the product or increase in yield, or any of them.

Another important object of the invention is to control to a more or less degree the possible damage to the crop from plant diseases, predatory insects or the like either by actually killing the disease, insect or other pest on the host plant, removing the same from the plant or by removing its source of food supply.

Another important object of the invention is to accomplish defoliation efficiently and under accurate control with a material which is not a soil poison but which has fertilizing value for the plant.

Calcium cyanamid has been found to be an excellent material useful for defoliation and any of the above purposes. This material can normally be obtained as a product resulting from the furnacing of calcium carbide in an atmosphere of nitrogen. In addition to large quantities of calcium cyanamid, this product also contains residual lime, carbide and some graphitic carbon. There are several grades of crude cyanamid on the market, any of which are suitable for the purpose intended.

For instance, there is a dusting grade which is a finely ground product containing substantially 2% of oil to reduce excessive dustiness, and there is also a so-called fertilizer grade which is somewhat the same compound except that the oil content has been raised to substantially 4%.

Granular cyanamid is a third physical form, in which the ground furnaced product is wetted to hydrate the residual lime and to remove any unreacted carbide. While in a moist state it is tumbled so as to form granules either with or without a binder and then dried. While granular cyanamid has a slightly different composition from the dusting or fertilizer grade, yet from the standpoint of the present invention the three forms are substantially equivalents. If the granular type of cyanamid is used it should be reground or actual granulation may be omitted so as to take advantage of its pulverulent condition.

While calcium cyanamid itself has been found particularly useful for defoliation purposes, yet other materials containing effective amounts thereof may also be used. For instance "Aero brand" calcium cyanide or "Cyanogas" contains residual quantities of calcium cyanamid. Actual tests in the field have shown that defoliation may be accomplished therewith. As a matter of fact this material is particularly effective where fumigation is desirable at the same time inasmuch as this product decomposes under the action of moisture to generate hydrocyanic acid, a recognized fumigant.

It has been found that if cyanamid is dusted upon the leaves of cotton plants, guayule plants, citrus trees, peach trees, and plum trees, apple trees, or the like, defoliation will result.

In the case of cotton plants, defoliation at a certain stage in its life is highly desirable as not only does it expose the lower bolls, which in a luxuriant plant are made inaccessible to sunlight, for ripening purposes, but is also desirable from the standpoint of efficient picking whether by hand or by machine.

In hand picking of cotton considerable time is lost in hunting for the open bolls because they are hidden in the foliage. If, therefore, the plant were defoliated, such bolls would be readily discernible and a more rapid picking could be accomplished.

In machine picking the practice is to permit the plant to reach its optimum maturity and then to strip the plant of its open bolls on one pass. If there are dried leaves on the plant at this time, not only is the product littered with them, commonly termed in the trade "trash," but there is a tendency for the green leaves to be crushed with resultant staining of the cotton with chlorophyll. This abnormal color is impossible of removal and definitely lowers the grade of the cotton so picked.

Defoliation of cotton has other advantages than mentioned above, as for instance, in such case the boll weevil is deprived of its food supply, prior to its entering a state of hibernation. As a consequence, there is a definite lessening of the numbers of these pests which are able to live through the winter and emerge in a healthy state.

Another material advantage of defoliating cotton prior to its picking is that at this state the cotton aphid is particularly prolific. This is a sucking insect existing on the leaves, and the aphid excrement commonly termed "honey-dew" is a recognized source of graying or discoloration of the cotton itself, particularly noticeable following the use of calcium arsenate for boll weevil control. Therefore, by knocking the leaves off at this stage it removes the aphid from the environment of the open bolls and therefore prevents the undesirable discoloration.

Moreover, calcium cyanamid is a high nitrogen fertilizer, so that any of the material which either remains on the leaves or which has fallen upon the ground may be utilized in the crop for the following season. This is in contra distinction to lead arsenate or other arsenicals which if used excessively poison the soil, especially for future crops of legumes.

Another important advantage in defoliation of plants is that insects and other pests to a large extent are located on the leaves. Obviously, therefore, if the leaves can be removed from the vicinity of the fruit of the plant, there is less tendency for the pests or diseases to attack the latter. Not only will the first generation of these pests or diseases be eliminated, but there is less opportunity for the formation of spores or larvae, as the case may be, for the production of a second generation for the next or following crops.

The guayule plant, which is coming more and more to the front as a source of rubber or rubber like material, is normally harvested when the plants are from five to ten feet high. When it has reached this stage of development, there are very few leaves on the lower part of the stalk, which is fortunate because it is the woody part of the stalk and the roots which furnish the sap material from which the rubber is made. According to present methods, however, it is desirable to force this crop and, therefore, plants are harvested before they reach the normal height where there is a deficiency of leaves at the lower part of the plant. On the contrary the entire stalk is covered with leaves at this stage. The guayule plant leaves are particularly succulent and contain large quantities of moisture. It is highly desirable, therefore, that these leaves be eliminated from the harvesting procedure as the presence of this moisture in the rubber extraction process introduces a real difficulty.

Dusting of young guayule plants with cyanamid has the desirable effect, therefore, of knocking the leaves off so that the bare stalk and roots may then be suitably treated without introducing this difficulty.

In defoliation of citrus trees, particularly tangerines, and also peach trees, plum trees, apple trees, and the like, as well as cotton plants, it is sometimes desirable to remove a certain number of leaves to more or less force the maturity of the fruit, either through increased sunlight reaching the fruit or to direct the energy which would otherwise go to the leaves into the fruit itself. This result may be accomplished without difficulty by controlled dusting with calcium cyanamid in any of the above grades or mixtures.

In defoliation with cyanamid it is highly desirable that a very finely divided product be used. The finer the product the more readily the same may be distributed. For instance, it has been determined that a very simple and efficient method of dusting or distribution is by means of an airplane, as not only may the quantity be distributed from above the plant itself, but due to the propeller slip stream, this creates a large amount of eddy currents which very efficiently disseminate the material where needed. For instance, it has been found that airplane distribution of cyanamid causes a deposit on cotton plant leaves not only on the top but on the bottom thereof and with amazing uniformity throughout all of the leaves on the plant. While hand or other mechanical dusting devices may be used, yet distribution of the defoliating material by such devices is not as efficient as through the preferred method of airplane dusting.

It is desirable to gage the application of cyanamid so that the cotton plant will have reached its optimum maturity and be ready for picking at the time the last leaves have dropped. This gives opportunity for those mature but unopened bolls to open due to the increased amount of sunlight which they receive. As a consequence, such plants may then be hand or, preferably, machine picked readily without delay, and particularly in the case of the latter without detrimental "trash" or staining of the cotton with chlorophyll. Defoliation of cotton plants near maturity will force an early opening of the bolls so that one picking will suffice. This also offers the opportunity of an early harvest and subsequent early destruction of all cotton stalks and field trash by plowing under, an excellent means for boll weevil control for the following crop.

The amount of cyanamid used will vary between wide limits depending upon a number of factors. Some of these factors which play a definite part are the spacing of the rows of the plants, the size of the plants, the luxuriance of the foliage and the like. To obtain efficient defoliation it is necessary that the particles of cyanamid be deposited upon each leaf. Any amount, therefore, which will accomplish this purpose is adequate. Generally speaking, it has been found that as little as ten pounds per acre if thoroughly disseminated in the atmosphere around the plant will cause the necessary deposit with resultant leaf drop. This amount will vary from this figure to perhaps as high as 75 or 100 pounds per acre for large and luxuriant plants, although from 10 to 50 pounds per acre is preferred. On the other hand, there is a maximum which should not be reached because of the failure to obtain the desired effect.

For instance, if too much is applied, the foliage will burn and has a tendency to wither and curl, and while its growth has been checked, yet the major number of the leaves do not drop off. Obviously, the results desired cannot be obtained by a mere curling of the leaves if they do not actually leave the plant and fall to the ground. Generally speaking 150 pounds per acre should not be reached, and this particularly applies to cotton plants.

In applying optimum quantities of cyanamid the effect thereof may be noticed in as little as six hours after application. The first visual results appear to be a devitalization of the leaf or its chlorophyll content particularly evident at the extreme edge or periphery of the leaf. This devitalization or paling continues throughout the leaf, and from three to eight days after application the leaf drops off. At this stage, the leaves have all the appearance of having been touched by frost.

While ordinarily speaking it would seem to be desirable to apply the cyanamid to the foliage at a time when it is moist with dew or rain to assist in sticking the cyanamid to the leaf, yet this is not always necessary. For instance, the cotton leaf is somewhat fuzzy in nature and as a consequence an adequate supply of cyanamid will remain on the leaf whether it is wet or dry. On the other hand on such waxy leaves as occur on the citrus trees, application while they are wet with dew may be desirable although adequate amounts of cyanamid have been found to adhere even without this wetting.

I claim:

1. A method of defoliating plants which includes the step of dusting the leaves with calcium cyanamide in a quantity sufficient to cause the leaves to drop off from the living plant.

2. The method of claim 1 in which the cyanamid in a finely ground material.

3. A method of defoliating plants which includes the step of dusting the leaves with calcium cyanamide in which the cyanamid is applied evenly at the rate of from 10 to 100 pounds per acre.

4. The method of defoliating cotton plants which includes the step of dusting the plant when near maturity with calcium cyanamid at the rate of from 10 to 100 pounds per acre.

THOMAS L. WILKERSON.